Oct. 18, 1932.   A. B. BIRTLES   1,883,499
METHOD AND APPARATUS FOR PRODUCING PLYWOOD
Filed July 11, 1931
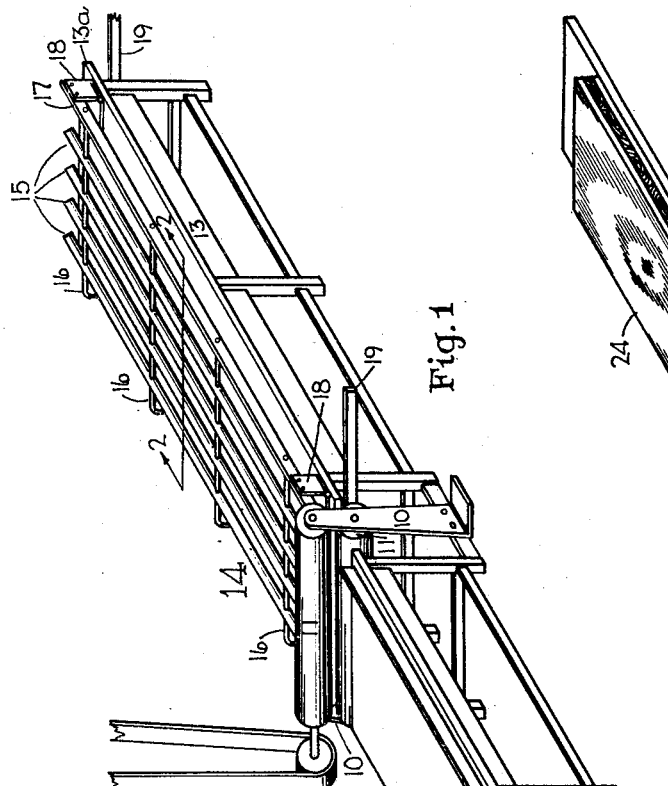
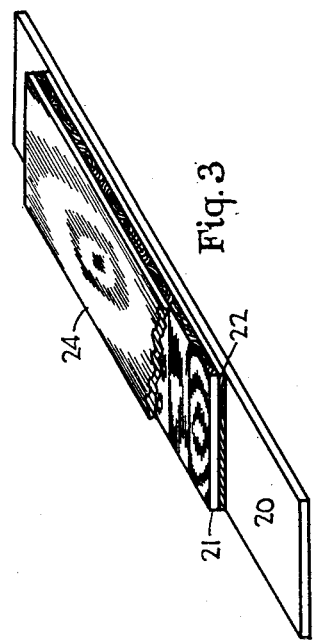
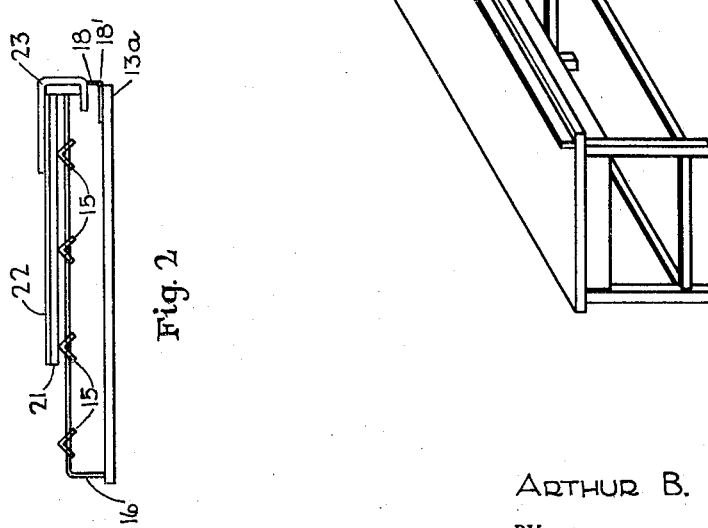
*INVENTOR.*
ARTHUR B. BIRTLES
BY John L. Milton
*ATTORNEY.*

Patented Oct. 18, 1932

1,883,499

UNITED STATES PATENT OFFICE

ARTHUR B. BIRTLES, OF LOUISVILLE, KENTUCKY

METHOD AND APPARATUS FOR PRODUCING PLYWOOD

Application filed July 11, 1931. Serial No. 550,059.

The purpose of this invention is to provide a method and apparatus for facilitating the economical gluing and assembling of the various members entering into the construction of plywood or a built up core which is covered with surface members designated as face veneer.

This machine is useful in any of the woodworking industries using a veneer construction consisting of the plurality of members, but is more particularly adapted for the production of flooring and paneling structure which is selected for illustration.

More particularly it is my object to provide a machine and a method of procedure whereby the members of a plywood structure are pre-shaped and delivered to the machine for passage therethrough employing an organized method of applying the glue to the constituent members and completing the product.

An object is to perform the work expeditiously and with precision with the minimum consumption of glue on the materials and a reduced amount of floor space for the machine.

A still further object is to reduce the number of manual operations and the labor costs entering into the product.

With these and other objects in view my invention consists in the construction, combination and arrangements of the various parts of my plywood apparatus and the method of operating same whereby the objects contemplated are attained as hereinafter more fully set forth and pointed out in my claims and illustrated in the accompanying drawing, in which—

Structure

Figure 1 is a perspective view illustrative of the mechanical apparatus employed in one interpretation of the invention.

Fig. 2 is a cross-sectional view of the top part of the rear table, as on line 2—2 of Fig. 1 plus a portion of the product and it further shows a means of securing same to the table top.

Fig. 3 is a perspective of a simple form of product with a portion of it broken away, the whole being assembled onto carrier or caul board.

10, 10 are pedestals carrying rollers 11, 11 which are to be automatically supplied with glue, the apparatus for this not being shown as it is an ordinary expedient and no part of this invention. 12 is a table placed substantially level with the openings between the rollers for the ready supply of the central or core members of the product which may be of any conventional form and spread out linearly on the top of the table for a given quantity or this material may be stacked. 13 is a table constituting the remote section of the apparatus which is especially constructed with a movable or swingable top 14 carrying inverted V shape rails 15 linearly disposed and at a selected level to receive the core members as they are fed through the rolls. The inverted V rails are employed to present a minimum of surface or bearing to the wet glue coated surfaces of the core members so as not to remove the glue. These rails, in the simple form selected for illustration, are secured by cross members 16 to a master rail 17 carrying hinges 18 which, in turn, are supported on the table 13 so that the entire top may describe a circular path about the hinges which function will be further explained hereinafter. On the table 13 are arms 19 which may be movable or stationary and are arranged to carry a receiving board such as 20, shown in Fig. 3 and is usually designated as a caul board.

Method of operation

The rolls are put into operation so as to be carrying the liquid glue, short cross cores 21 of the product shown in Fig. 3 are assembled on table 12, and then manually, serially fed through the rolls where they are enveloped with glue and on to inverted V rails 15, each succeeding core member forcing the preceding one through the rolls thereby substantially eliminating the spaces normally occurring between same. When the desired length of cross members have been coated and transferred to table 14 they are stopped and a surface or veneer member 22 or a plurality of same is placed on top.

The product thus far processed is secured directly to rack 14 by means of a series of clamps 23 in order that it may be reversed without disturbance. At this stage the entire top with product is swung about hinges 18 until same is reversed and resting on caul board 20 which had been placed on to arms 19. At this stage the clamps 23 are removed, then rack is returned to position shown in Fig. 1 which leaves the product resting on the caul board with veneer facing 22 down and the formerly lower glue coated side of the cores 21 faced up to receive the other surface or veneer member 24.

At this stage the caul board is removed to be placed in a press for final setting and another caul board placed on to arms 19 which completes the cycle. The apparatus is now ready for a repetition of the process.

Cores 21 are preferably so placed on table 12 that in passing through the rolls on to rack 14 their near ends will fall in line with the master rail 17 which projects above rails 15 for the purpose of determining the alignment of parts 21 and 22. This alignment is preserved during clamping or securing referred to above until said clamps are removed. To care for any incident misalignment of these parts this master rail has been sufficiently elevated so that in the return movement on axis 18' of hinge 18, it will engage the cores and veneer which are at this stage still surfaced with unset or fluid glue and thereby align same after they have been deposited on to the caul board. It will readily be seen that this feature was developed for the purpose of mechanical alignment and elimination of an otherwise probable manual operation.

*Scope*

The apparatus I have shown is purposely selected for its simplicity, in being of an early type in the development of this invention. Many modifications may be indulged without departing from the spirit of the invention, such as by adding automatic feeding apparatus and means to rotate the receiving rack about the axis shown or other axes. Therefore, I wish to be limited only by the appended claims.

I claim:

1. The method of assembling layers of wood or the like for producing a built up structure of plywood which comprises simultaneously coating the opposite faces of a succession of core stock pieces to constitute the central members with an adhesive and delivering same onto a pivotally reversible rack, then applying a surface product member to the exposed surface and securing the product thus far processed to said rack, then reversing the whole and releasing said product and applying another surface member entering into the product to the last exposed surface.

2. The method of assembling layers of wood or the like for producing a built up structure of plywood which comprises simultaneously coating the opposite faces of a central member with an adhesive and delivering same onto a pivotally reversible rack, then applying a surface product member to the exposed surface and securing the product thus far processed to said rack, then reversing the whole to expose the under surface of the central member, releasing said product and applying another surface member entering into the product to the last exposed surface.

3. The method of preparing layers of wood or the like for producing a built up structure of plywood which comprises simultaneously coating the opposite faces of a succession of core stock pieces to constitute the central members with an adhesive and delivering same onto a pivotally reversible rack equipped with an aligning rail, then applying a surface product member to the exposed surface and securing the product thus far processed to said rack, then reversing the whole to expose the under surface of the central members, releasing and aligning said product by said rail and then applying another surface member entering into the product to the last exposed surface.

4. A gluing machine comprising means providing a pathway for the work, applying glue to both faces thereof and feeding the work forward, a member receiving the work so fed which is pivotally mounted to turn over and having means to secure the work thereto so as to be turned over thereby.

5. A gluing machine comprising means providing a pathway for the work, applying glue to both faces thereof and feeding the work forward, a member provided with a series of rails forming a horizontally disposed rack to receive the work so fed which is pivotally mounted to turn over and having means to secure the work thereto so as to be turned over thereby.

6. In an apparatus for making plywood comprising two tables, a pair of glue applying rolls disposed between said tables for feeding core stock and coating both sides of said stock as it passes from the front table to the back table which is equipped with a member for receiving the work so fed which is pivotally mounted to turn over and having means to secure the work thereto so as to be turned over thereby.

7. In an apparatus for making plywood comprising equipment for storing stock, adjacent to which is disposed a pair of glue applying rolls for feeding core stock and coating both sides of said stock as it passes through said rolls to a member which is equipped for receiving the work so fed which is pivotally mounted to turn over and having means to secure the work thereto so as to be turned over thereby.

In testimony whereof I affix my signature.
ARTHUR B. BIRTLES.